United States Patent
Crabb et al.

(10) Patent No.: US 8,269,895 B2
(45) Date of Patent: Sep. 18, 2012

(54) RECURSIVE NOISE REDUCTION SYSTEM AND METHOD FOR FILM-BASED VIDEO

(75) Inventors: Michael Crabb, Carmel, IN (US); Mark Francis Rumreich, Indianapolis, IN (US)

(73) Assignee: Shenzhen TCL New Technology Ltd, Shekou, Shenzhen, Guangdong (CN)

( * ) Notice: Subject to any disclaimer, the term of this patent is extended or adjusted under 35 U.S.C. 154(b) by 351 days.

(21) Appl. No.: 12/734,109

(22) PCT Filed: Oct. 31, 2007

(86) PCT No.: PCT/US2007/083182
§ 371 (c)(1),
(2), (4) Date: Apr. 9, 2010

(87) PCT Pub. No.: WO2009/051601
PCT Pub. Date: Apr. 23, 2009

(65) Prior Publication Data
US 2010/0208133 A1      Aug. 19, 2010

(30) Foreign Application Priority Data
Oct. 18, 2007 (CN) .......................... 2007 1 0124028

(51) Int. Cl.
*H04N 5/00* (2011.01)
(52) U.S. Cl. ......... 348/607; 348/441; 348/448; 348/701
(58) Field of Classification Search .................. 348/607, 348/441, 443, 447, 448, 452, 458–459, 526–527, 348/558, 700–701, 620; *H04N 5/00, 7/01*
See application file for complete search history.

(56) References Cited

U.S. PATENT DOCUMENTS

| | | | |
|---|---|---|---|
| 4,881,125 A | 11/1989 | Krause | |
| 4,998,287 A | 3/1991 | Katznelson et al. | |
| 5,107,340 A | 4/1992 | Hirata et al. | |
| 5,508,750 A | 4/1996 | Hewlett et al. | |
| 5,929,919 A * | 7/1999 | De Haan et al. | 348/452 |

(Continued)

FOREIGN PATENT DOCUMENTS

EP      1005227 A2      5/2000

(Continued)

OTHER PUBLICATIONS

Extended European Search Report for EP Application No. 07854540.7 dated May 13, 2011, 15 pgs.

(Continued)

*Primary Examiner* — Trang U Tran
(74) *Attorney, Agent, or Firm* — Fletcher Yoder P.C.

(57) ABSTRACT

Embodiments of the present invention are directed to a system and method for recursive noise reduction. An exemplary method comprises receiving a first film frame having a first frame rate and a second film frame having the first frame rate and converting the first film frame into a first plurality of video frames having a second frame rate. The exemplary method further comprises converting the second film frame into a second plurality of video frames having the second frame rate, wherein the first plurality of video frames is positioned adjacent the second plurality of video frames at a border between the first plurality of video frames and the second plurality of video frames and updating a noise reduction correction signal only on the border between the first plurality of video frames and the second plurality of video frames when operating in a first mode.

20 Claims, 5 Drawing Sheets

U.S. PATENT DOCUMENTS

| | | | |
|---|---|---|---|
| 6,061,100 | A | 5/2000 | Ward et al. |
| 6,111,610 | A | 8/2000 | Faroudja |
| 6,839,094 | B2 | 1/2005 | Tang et al. |
| 6,847,406 | B2 * | 1/2005 | Dantwala et al. ............ 348/452 |
| 7,295,245 | B2 * | 11/2007 | Ha ............................... 348/452 |
| 7,738,037 | B2 * | 6/2010 | Tang et al. .................... 348/441 |
| 2003/0053416 | A1 | 3/2003 | Ribas-Corbera et al. |
| 2006/0093236 | A1 | 5/2006 | Drezner et al. |
| 2006/0114994 | A1 * | 6/2006 | Silverstein ............... 375/240.12 |
| 2007/0140357 | A1 | 6/2007 | Montgomery |

FOREIGN PATENT DOCUMENTS

JP             04082381 A      3/1992

OTHER PUBLICATIONS

Martinez et al., Implicit Motion Compensated Noise Reduction of Motion Video Scenes; IEEE International conference on ICASSP '85, vol. 10; pp. 375-378; Apr. 1985.

* cited by examiner

RECURSIVE NOISE REDUCTION SYSTEM AND METHOD FOR FILM-BASED VIDEO

BACKGROUND

This section is intended to introduce the reader to various aspects of art which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

To optimize the appearance of video images derived from film on a television display, it is common practice to upconvert video that originated as 24 or 30 frames per second (fps) film to a higher frame rate video format. Such an upconversion process entails duplicating existing frames and using them more than once to increase the frame rate. Noise that exists in the original 24 fps domain (i.e., recursive noise) becomes more difficult to remove after the upconversion process.

Conventional recursive noise reduction systems reduce noise in upconverted video frames by generating a noise reduction (NR) correction signal for each upconverted video frame based on the difference between the current frame and the previously filtered video frame. Such systems, however, typically fail to provide effective noise correction for video frames that do not immediately follow a film frame boundary. An improved system and method of providing recursive noise correction in a video system is desirable.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention relate to a recursive noise reduction system that updates noise reduction correction signals based on differences between the current video frame and a previously filtered video frame. More specifically, embodiments of the present invention update noise reduction correction signals based only on comparison with video frames on a frame boundary between a plurality of upconverted video frames created from a film frame and a subsequent plurality of upconverted video frames created from another film frame. Selectively updating the noise reduction correction signal in this manner results in provision of effective noise reduction correction signals for every upconverted video frame, including noise reduction correction signals for upconverted video frames not immediately following a film frame boundary.

Figure 1:
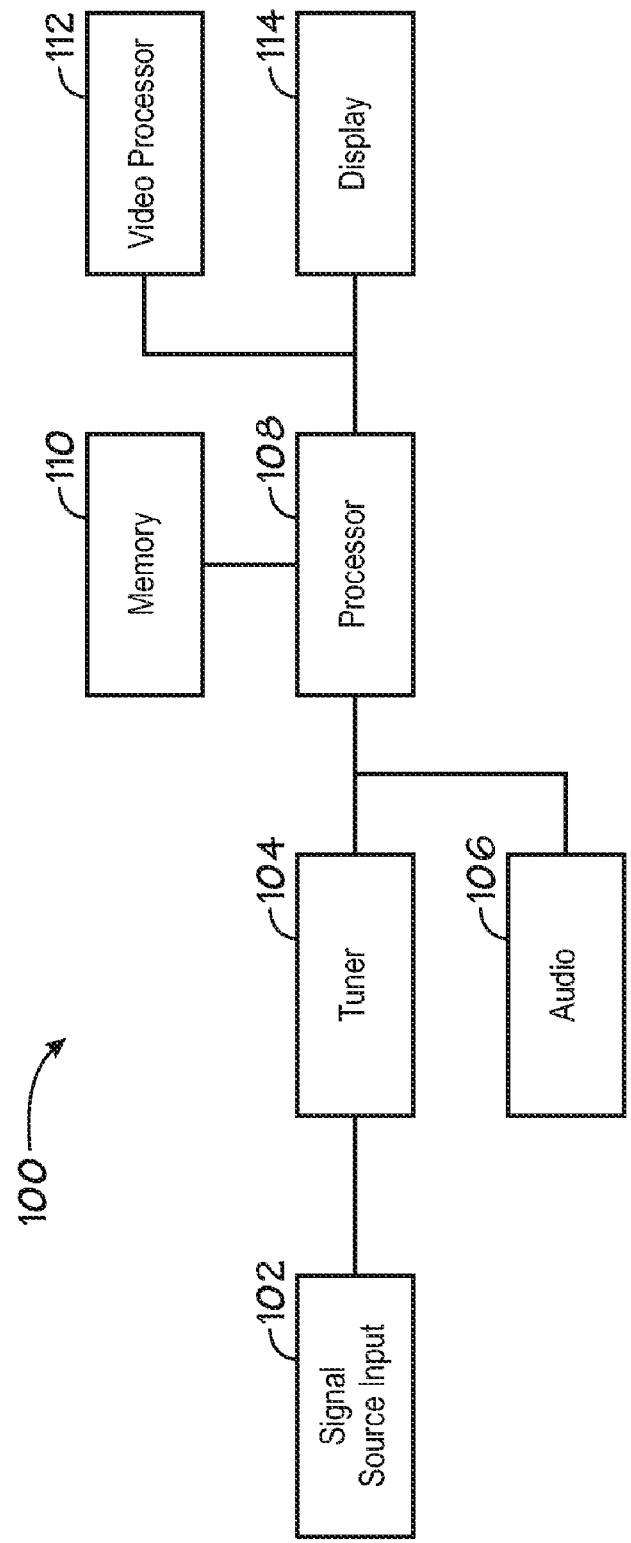
FIG. 1 is a block diagram of an electronic device in accordance with an exemplary embodiment of the present invention.

Turning now to the figures, FIG. 1 is a block diagram of an electronic device in accordance with an exemplary embodiment of the present invention. The electronic device is generally indicated by reference numeral 100. The electronic device 100 (e.g., a television, a portable DVD player or the like) comprises various subsystems represented as functional blocks in FIG. 1. Those of ordinary skill in the art will appreciate that the various functional blocks shown in FIG. 1 may comprise hardware elements (including circuitry), software elements (including computer code stored on a machine-readable medium), or a combination of both hardware and software elements.

A signal source input 102 may comprise an antenna input, an RCA input, an S-video input, a composite video input, or the like. Those of ordinary skill in the art will appreciate that, although only one signal source is shown, the electronic device 100 may have multiple signal source inputs. The signal source input 102 is adapted to receive a signal that comprises video data and, in some cases, audio data. The signal received by the signal source input 102 may comprise a broadcast spectrum (e.g., if the signal source input 102 comprises an antenna) or a single channel of video and/or audio data (e.g., if the signal source input 102 comprises a DVD player or the like).

A tuner subsystem 104 is adapted to tune a particular video program from a broadcast signal received from the signal input source 102. Those of ordinary skill in the art will appreciate that input signals that are not received as part of a broadcast spectrum may bypass the tuner 104, because tuning is not required to isolate a video program associated with those signals.

The electronic device 100 may include an audio subsystem 106. The audio subsystem 106, which may comprise an audio amplifier, may be adapted to play audio data associated with video data being displayed by the electronic device 100.

A processor 108 is adapted to control the overall operation of the electronic device 100. A memory 110 may be associated with the processor 108 to hold machine-readable computer code that enables the processor 108 to control the operation of the electronic device 100.

A video processor 112 comprises an upconversion system and a recursive noise reduction system in accordance with an exemplary embodiment of the present invention. Those of ordinary skill in the art will appreciate that functionality provided by the video processor 112 could either be located externally from the processor 108 or incorporated into the processor 108.

Exemplary embodiments of the present invention relate to the removal of recursive noise that is inherently present in video data filmed at a rate in the range of about 24 fps to 30 fps. When film video is upconverted to a higher frame rate (for example, 60 fps for MPEG video), frames at the lower frame rate are duplicated. One typical conversion scheme known as the 3:2 pulldown technique alternates between duplicating film frames three times or two times. In other words, a first film frame is duplicated three times, a second film frame is duplicated two times and so on. Another upconversion technique is known as 2:2 pulldown, in which all film frames are duplicated twice. When processing MPEG video data that has been upconverted, the video processor 112 takes into account the fact that video frames were duplicated. In so doing, the video processor 112 operates under the assumption that recursive noise of duplicated frames is the same. Accordingly, a noise correction signal applied by the video processor 112 is updated only at frame boundaries between pluralities of MPEG frames corresponding to individual film frames. For a given film-based video sequence, the recursive noise reduction system accepts an upconverted video frame as an input, applies a noise reduction correction signal to the upconverted video frame, and outputs a filtered video frame.

The filtered video frames produced by the recursive noise reduction system may be relayed to a display subsystem 114 for external viewing. The display subsystem 114 may comprise a liquid crystal (LCD) display, a liquid-crystal-on-silicon (LCOS) display, a digital light projection (DLP) display or any other suitable display type.

Figure 2:
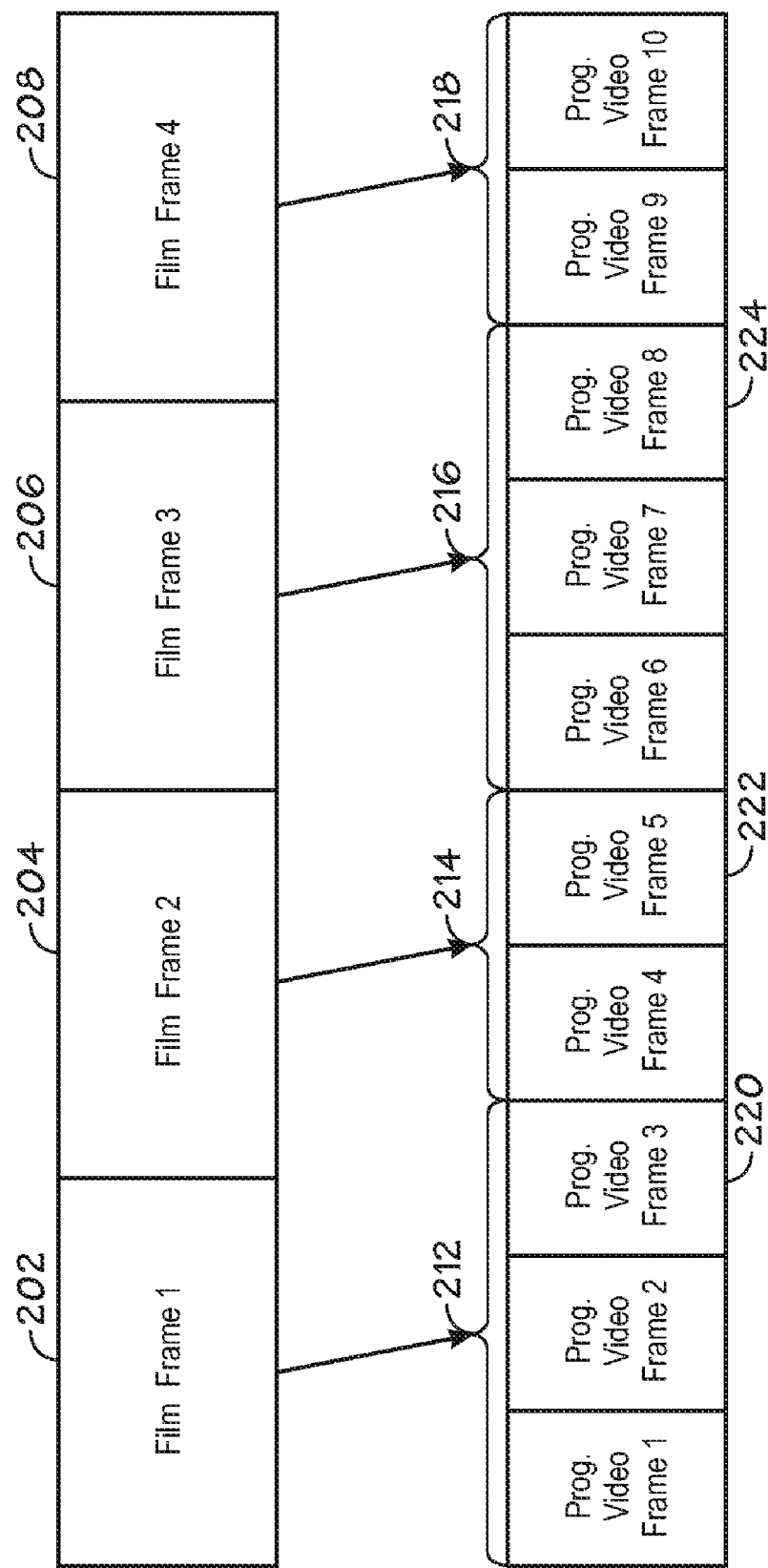
FIG. 2 is a block diagram showing an exemplary upconversion process in accordance with an embodiment of the present invention.

FIG. 2 is a block diagram showing an exemplary upconversion process in accordance with an embodiment of the present invention. As will be appreciated by one of ordinary skill in the art, a 3:2 pulldown technique entails creating 60 fps progressive video from a 24 fps film source. In FIG. 2, four film frames 202, 204, 206 and 208 are upconverted into four pluralities of progressive video frames, respectively indicated by the reference numerals 212, 214, 216 and 218. Film frame boundaries of the pluralities of progressive video frames are indicated by reference numerals 220, 222 and 224. Film frame boundary information is typically available for use in accordance with embodiments of the present invention because frame recursive noise reduction is typically performed at the same time as the inverse 3:2 pulldown processing. If this is not the case, the film frame boundaries (e.g., 220, 222 and 224) may be detected through video frame differencing in accordance with an exemplary embodiment of the present invention.

Each upconverted progressive video frame is duplicative of the film frame from which it was created. The 3:2 pulldown technique uses a 3-2-3-2 cadence. That is to say, half of the film frames are upconverted into three progressive video frames, while the other half are upconverted into two progressive video frames. In addition, the pluralities of three progressive video frames alternate with the pluralities of two progressive video frames. The 3-2-3-2 cadence of the 3:2 pulldown technique is illustrated in FIG. 2. For example, film frame 202 is upconverted into the plurality of three progressive video frames 212. Subsequently, film frame 204 is upconverted into a plurality of two progressive video frames 214. Then, film frame 206 is upconverted into the plurality of three progressive video frames 216. Finally, film frame 208 is upconverted into the plurality of two progressive video frames 218. In an exemplary embodiment of the present invention, the video processor 112 (FIG. 1) may be adapted to maintain the 3-2-3-2 cadence for an entire video sequence inputted into the upconversion system.

Figure 3:
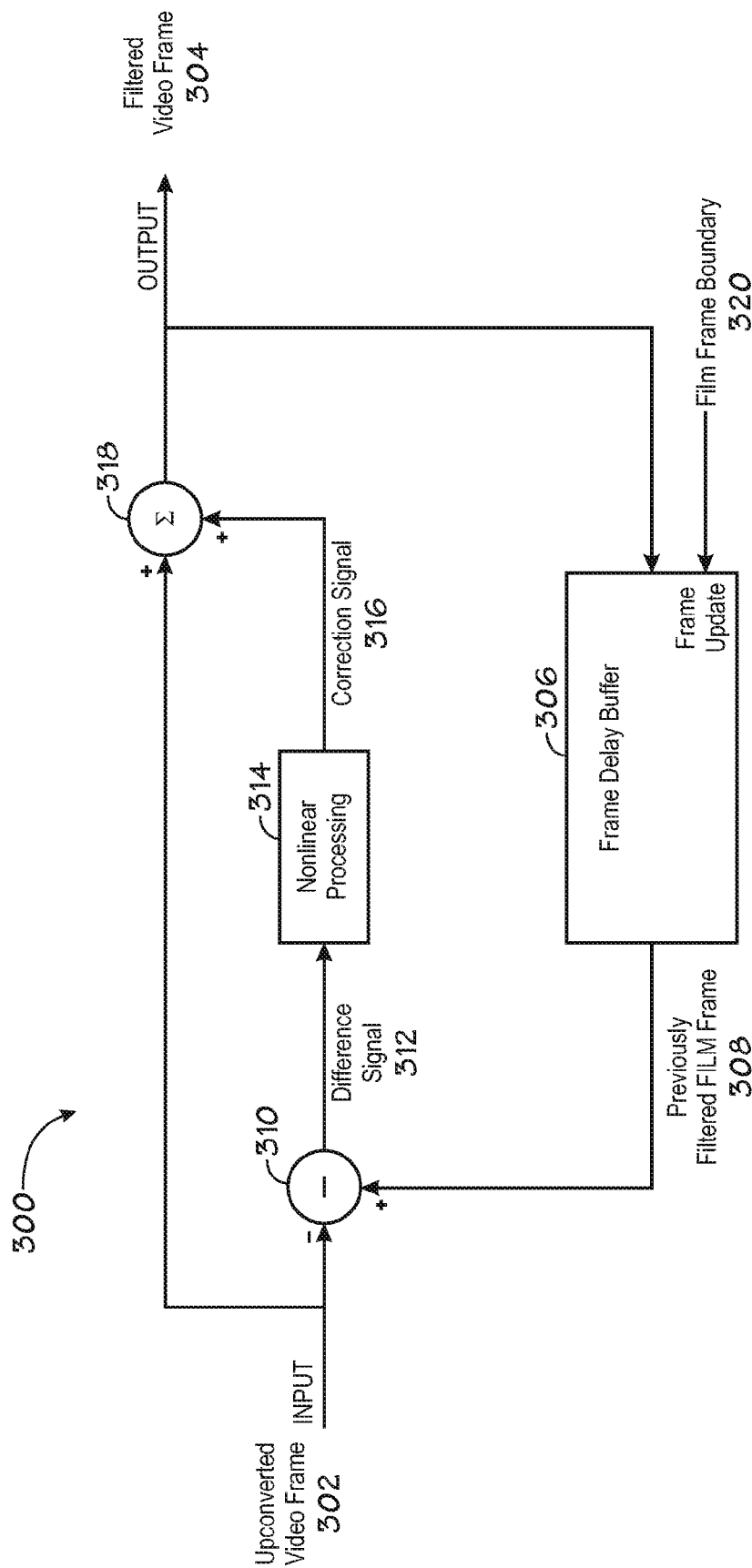
FIG. 3 is a diagram of an exemplary frame recursive noise reduction system in accordance with an embodiment of the present invention.

FIG. 3 is a diagram of an exemplary frame recursive noise reduction system in accordance with an embodiment of the present invention. The recursive noise reduction system is generally indicated by reference numeral 300. The recursive noise reduction system 300, which may comprise a portion of the video processor 112 (FIG. 1), implements a process for applying a noise reduction correction signal to an upconverted video frame in accordance with an exemplary embodiment of the present invention. Generally, the recursive noise reduction system 300 accepts an upconverted video frame 302 as an input, applies a noise reduction correction signal to the upconverted video frame, and outputs a filtered video frame 304.

The process implemented by the recursive noise reduction system 300 is described in further detail below. A frame delay buffer 306 stores a previously-filtered video frame 308. The previously-filtered video frame 308 is the filtered video frame that most recently occurred at a film frame boundary. The upconverted video frame 302 and the previously-filtered video frame 308 are processed by the differencing block 310 to produce a difference signal 312. Subsequently, the difference signal 312 is processed by a nonlinear processing block 314 to produce a noise reduction correction signal 316. The noise reduction correction signal 316 and the upconverted video frame 302 are processed by a summation block 318 to produce the filtered video frame 304, which is the output of the system. If the filtered video frame 304 occurs at a film frame boundary, a film frame boundary control signal 320 is enabled, and the filtered video frame is copied into the frame delay buffer 306 for use as the previously-filtered video frame 308 in the next iteration of the system process. If the filtered video frame 304 does not occur at a film frame boundary, the film frame boundary control signal 320 is disabled, and the previously-filtered video frame 308 stored in the frame delay buffer 306 is unchanged.

By copying a filtered video frame to the frame delay buffer 306 only when a film frame boundary occurs, the present invention produces effective noise reduction correction signals for all upconverted video frames. This selective copying technique renders the present invention superior to conventional systems. Indeed, conventional systems copy all filtered video frames to a frame delay buffer, resulting in ineffective noise reduction correction signals for any upconverted video frames that do not immediately follow a film frame boundary.

If desired, the recursive noise reduction system 300 can be adjusted to function identically to conventional noise reduction systems in certain instances. This can be accomplished by permanently enabling the film frame boundary control signal 320 so that a filtered video frame 304 is invariably copied into the frame delay buffer 306 for use as the previously-filtered video frame 308 in the next iteration of the system process. By adjusting the recursive noise reduction system 300 in this manner, it will function identically to conventional systems. That is, all filtered video frames will be copied into the frame delay buffer 306 instead of only video frames at film frame boundaries.

Enabling the recursive noise reduction system 300 to function identically to conventional systems in certain instances could permit the system to operate in both "improved film mode" and "standard mode." Operating the system in "improved film mode" would entail copying filtered video frames into the frame delay buffer 306 only at film frame boundaries in accordance with embodiments of the present invention. Operating the system in "standard mode" would entail copying all filtered video frames to the frame delay buffer 306 in accordance with conventional recursive noise reduction systems. While film-based video received via digital broadcast or digital cable (i.e., ATSC or QAM) ideally would be processed in improved film mode, video received via analog broadcast or analog cable ideally would be processed in standard mode. Thus, the adaptability of the recursive noise reduction system 300 renders it viable for use with a broad range of video types.

Figure 4:
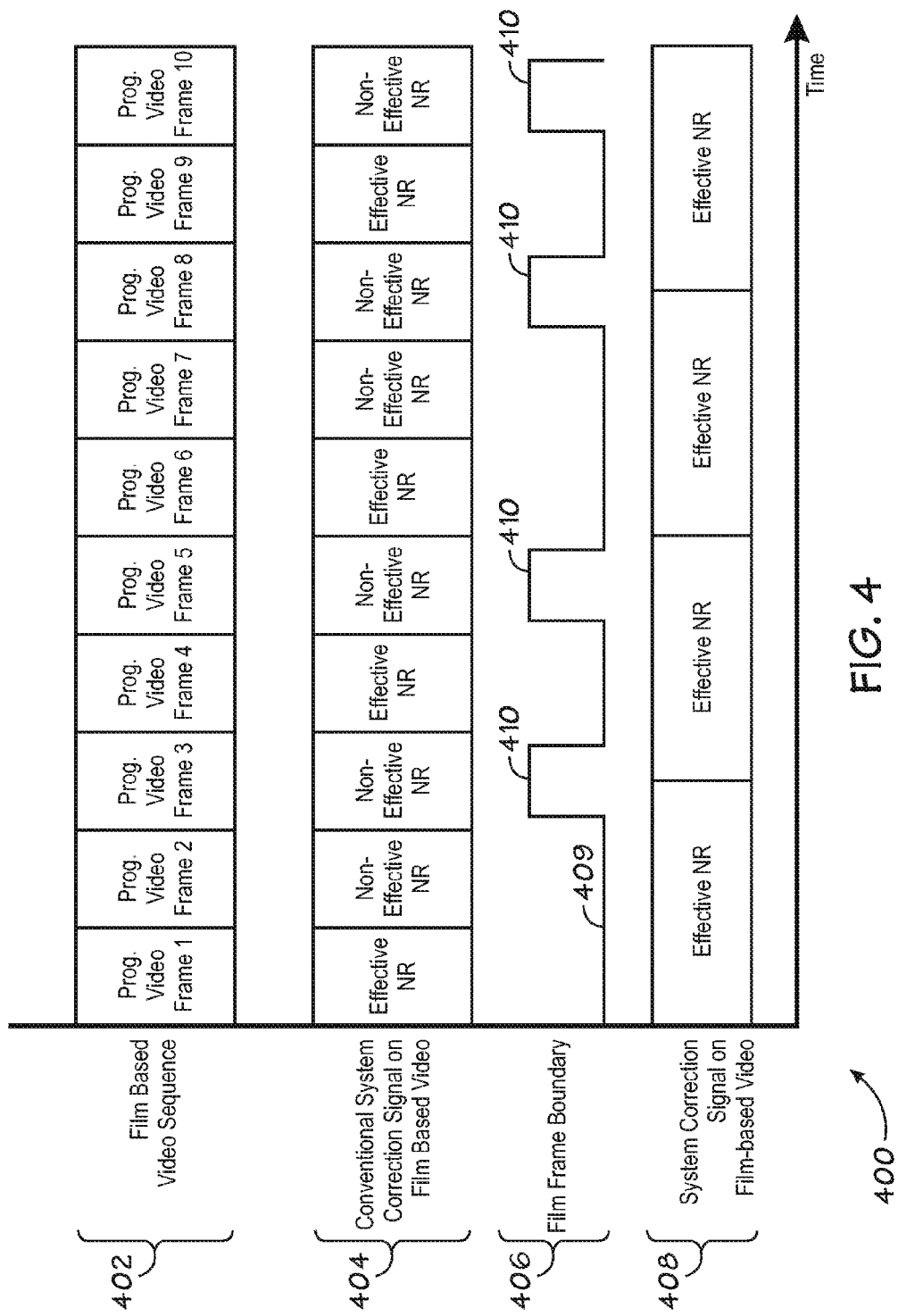
FIG. 4 is a graph representation showing expected performance of a recursive noise reduction system in accordance with an exemplary embodiment of the present invention relative to expected performance of a conventional recursive noise reduction system.

FIG. 4 is a graph representation showing expected performance of a recursive noise reduction system in accordance with an exemplary embodiment of the present invention relative to expected performance of a conventional recursive noise reduction system. The graph, which is generally referred to by the reference number 400, illustrates the relative advantages of the recursive noise reduction system in accordance with embodiments of the present invention when applied to a film-based video sequence. Specifically, the graph 400 includes a first row 402, a second row 404, a third row 406 and a forth row 408. Each row includes data that is associated with data from the other rows based on alignment in the graph 400. The first row 402 includes blocks that represent a film-based video sequence including numerous frames. The second row 404 includes blocks with indicators that represent which of the frames in row 402 receive effective noise reduction and non-effective noise reduction using conventional systems. The third row 404 includes a graphical line 409 indicating which frames are at film frame boundaries and which are not. Specifically, the film frame boundaries are indicated by the steps 410 in the graphical line 409. The fourth row 408 represents which of the frames in row 402 receive effective noise reduction using an exemplary embodiment of the present invention.

As illustrated by row 404 in the graph 400, the noise reduction correction signal applied to film-based video frames by conventional recursive noise reduction systems is effective only for video frames immediately following the film frame boundaries. Indeed, because subsequent frames within a series may be the same, noise reduction is diluted in conventional systems. However, the noise reduction correction signal applied to video frames by a system in accordance with an exemplary embodiment of the present invention is effective for all video frames, as illustrated by row 408.

Figure 5:
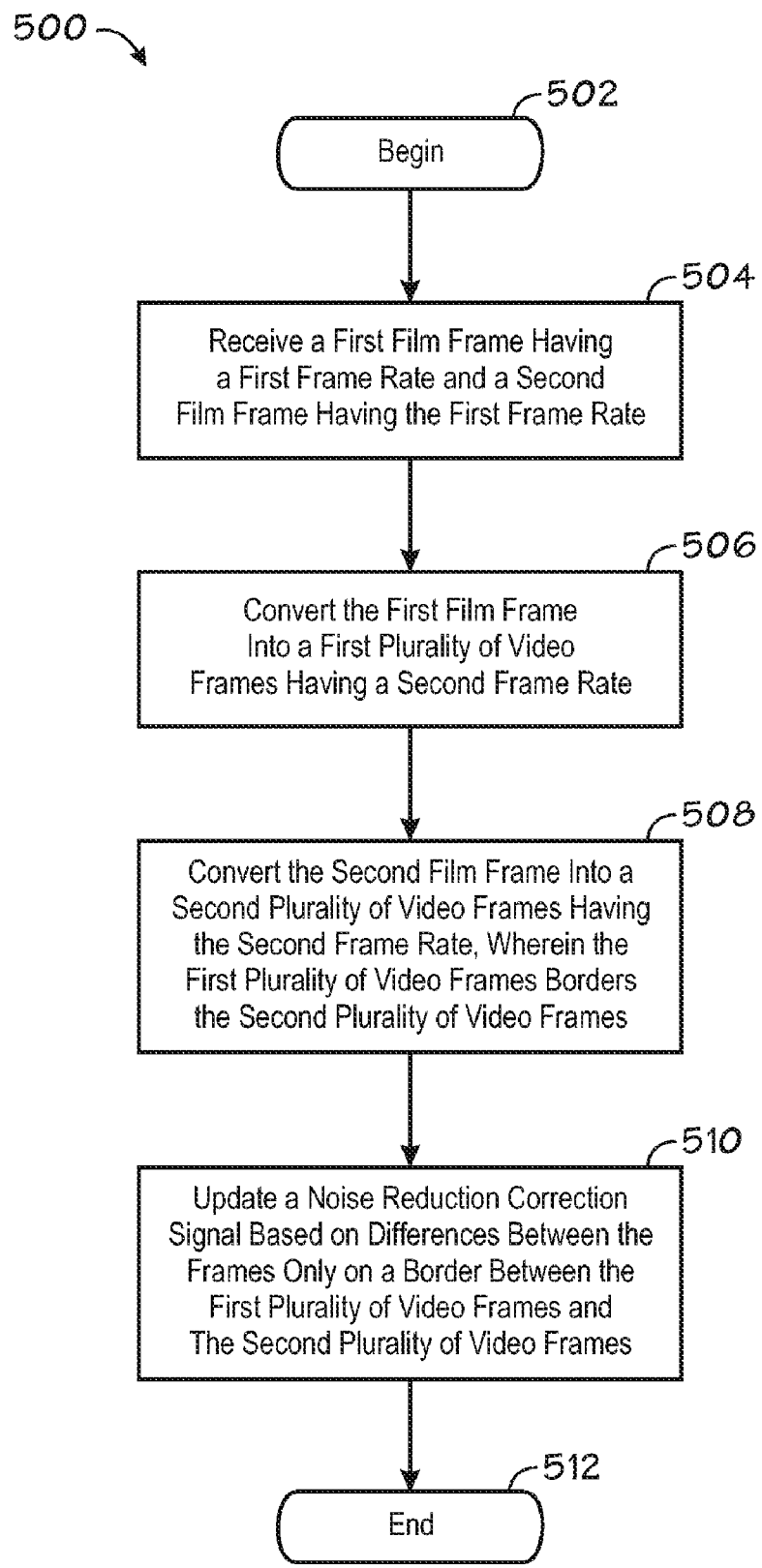
FIG. 5 is a process flow diagram illustrating a method in accordance with an exemplary embodiment of the present invention.

FIG. 5 is a process flow diagram illustrating a method in accordance with an exemplary embodiment of the present invention. The process is generally indicated by reference numeral 500. At block 502, the process begins. At block 504, a first film frame having a first frame rate and a second film frame having the first frame rate are received. At block 506, the first film frame is converted into a first plurality of video frames having a second frame rate. At block 508, the second film frame is converted into a second plurality of video frames having the second frame rate, wherein the first plurality of video frames is positioned adjacent the second plurality of video frames at a border between the first plurality of video frames and the second plurality of video frames. At block 510, a noise reduction correction signal is updated only on the border between the first plurality of video frames and the second plurality of video frames. The process ends at block 512.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method, comprising:
receiving a first film frame having a first frame rate and a second film frame having the first frame rate;
converting the first film frame into a first plurality of video frames having a second frame rate;
converting the second film frame into a second plurality of video frames having the second frame rate, wherein the first plurality of video frames is positioned adjacent the second plurality of video frames at a border between the first plurality of video frames and the second plurality of video frames; and
updating a noise reduction correction signal only on the border between the first plurality of video frames and the second plurality of video frames when operating in a first mode.

2. The method recited in claim 1, comprising updating the noise reduction correction signal for each of the first plurality of video frames and the second plurality of video frames when operating in a second mode.

3. The method recited in claim 2, comprising outputting the one Of the second plurality of video frames after correction as a filtered video frame.

4. The method recited in claim 1, wherein converting the first Film frame into the first plurality of video frames comprises employing 3:2 pulldown processing.

5. The method recited in claim 1, comprising detecting the first border via video frame differencing.

6. The method recited in claim 1, comprising storing at least a One of the first plurality of video frames adjacent the border in a buffer for comparison with at least a one of the second plurality of video frames.

7. The method recited in claim 1, wherein converting the first Film frame into the first plurality of video frames comprises employing 2:2 pulldown processing.

8. The method recited in claim 1, comprising:
receiving a third film frame having the first frame rate;
converting the third film frame into a third plurality of video frames having the second frame rate, wherein the second plurality of video frames is positioned adjacent the third plurality of video frames at a second border;
updating the noise reduction correction signal based on a difference between a one of the second plurality of video frames adjacent the second border and a one of the third plurality of video frames; and
not updating the noise reduction correction signal based on a difference between any of the third plurality of video frames.

9. The method recited in claim 1, comprising receiving the first film frame via a digital broadcast.

10. The method recited in claim 1, wherein the acts recited in claim 1 are performed in the order in which they are recited in claim 1.

11. An electronic device, comprising:
a video signal source that is adapted to receive video data having a first frame rate; and
a video processor that is adapted to:
convert video frames of the video data into corresponding pluralities of frames at a second frame rate, wherein each of the pluralities of frames at the second frame rate has a border with another of the pluralities of frames at the second frame rate; and
update a noise reduction correction signal based on Differences between the frames of video data only at the border between the pluralities of frames at the second frame rate when operating in a first mode.

12. The electronic device recited in claim 11, wherein the video processor is adapted to update the noise reduction correction signal for each of the first plurality of video frames and the second plurality of video frames when operating in a second mode.

13. The electronic device recited in claim 11, wherein the video processor is adapted to perform 3:2 pulldown processing.

14. The electronic device recited in claim 11, wherein the video processor is adapted to perform video frame differencing.

15. The electronic device recited in claim 11, comprising a buffer configured to store frames adjacent the border for comparison with other frames.

16. The electronic device recited in claim 11, comprising a summation block adapted to produce a filtered video frame based on the noise reduction correction signal.

17. The electronic device recited in claim 11, wherein the video signal source is adapted to receive a digital broadcast.

18. The electronic device recited in claim 11, wherein the electronic device comprises a television.

19. An electronic device, comprising:
  means for receiving a first film frame having a first frame rate and a second film frame having the first frame rate;
  means for converting the first film frame into a first plurality of video frames having a second frame rate;
  means for converting the second film frame into a second plurality of video frames having the second frame rate, wherein the first plurality of video frames is positioned adjacent the second plurality of video frames at a border between the first plurality of video frames and the second plurality of video frames; and
  means for updating a noise reduction correction signal only on the border between the first plurality of video frames and the second plurality of video frames when operating in a first mode.

20. The electronic device recited in claim 19, comprising means for updating the noise reduction correction signal for each of the first plurality of video frames and the second plurality of video frames when operating in a second mode.

* * * * *